June 14, 1955  D. F. OBERG  2,710,633
TABLE SAW MITER GAUGE AND RIP FENCE
Filed Feb. 8, 1954

Fig. 2 (Z-Z)

INVENTOR
Donald F. Oberg
BY Carroll R. Ismo.
ATTORNEY

2,710,633
TABLE SAW MITER GAUGE AND RIP FENCE
Donald F. Oberg, Linwood, Mich.

Application February 8, 1954, Serial No. 408,818

3 Claims. (Cl. 143—169)

The invention relates to an improvement in table saws and more particularly concerns an attachment for table saws which serves as a combined miter gauge and rip fence.

In the use of table saws it is conventional to have a separate miter gauge and rip fence to provide for the cross-cutting sawing operation and the ripping operation. However the use of table saws with these separate attachments renders it necessary that the one attachment be removed when the other is in use, making it necessary to continually replace one attachment or the other during the ordinary use of such equipment. It is therefore desirable to provide a single attachment that can be readily and effectively used as both a miter gauge and a rip fence.

The principal object of the invention is to provide a device which may serve as either a miter gauge or a rip fence on a conventional table saw.

Another object of the invention is to provide a simple means whereby the combined miter gauge and rip fence may be easily and quickly locked at a desired position when the device is serving as a rip fence.

A further object of the invention is to provide an attachment for table saws that is susceptible of ready and rapid positioning in the top of the table of the saw.

Another object of the invention is to provide a table top for table saws that is designed to accommodate my new combined miter gauge and rip fence.

Other objects and advantages will appear during the course of the following description, which taken in conjunction with the annexed drawing sets forth in detail certain means of putting the invention into effect, illustrating however, but one of the various ways in which the principle of the invention may be used.

In the drawings:

Fig. 2 is an enlarged fragmentary sectional view along lines 2—2 of Fig. 1 looking in the direction of the arrows.

Figure 1:
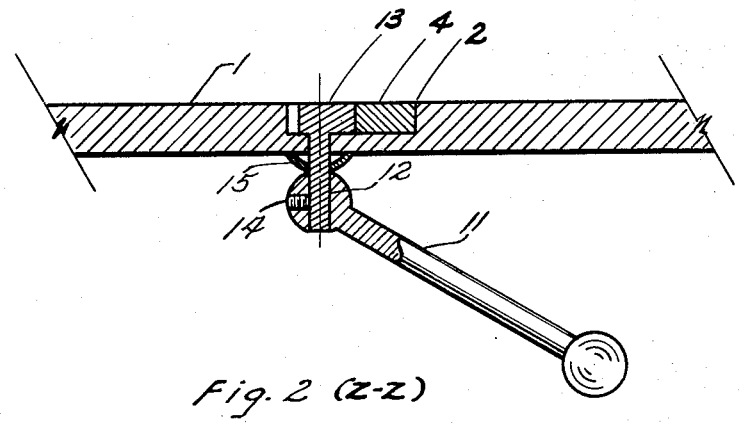
Fig. 1 is a top plan view of a table saw incorporating my invention.
Figure 1:
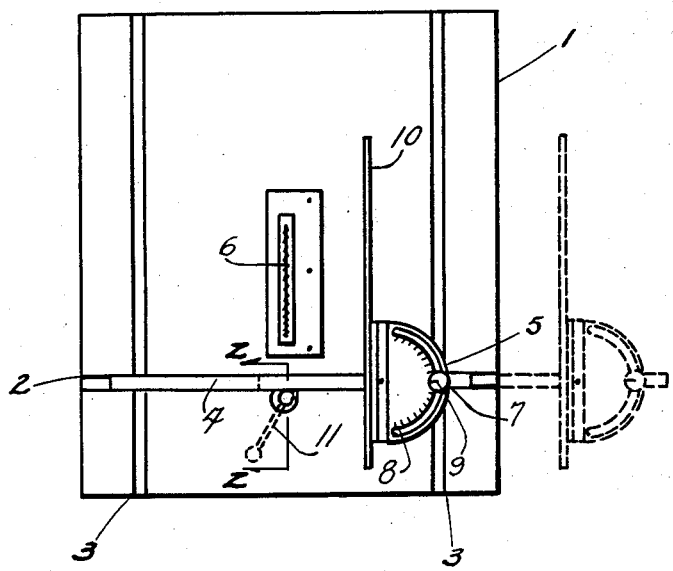

Referring to Fig. 1 the table 1 of the table saw is provided with a cross-wise slot 2 as well as the usual lengthwise slots 3 in which the bar 4 of miter gauge 5 is adapted to slide. The cross-wise slot 2 will be usually located ahead of circular saw-blade 6 to allow more convenient manual locking of the miter gauge and rip fence in place. The miter gauge 5 is angularly adjustable in the conventional manner as by means of clamp-screw 7. The position of the miter gauge is readily ascertainable by means of scale 8 and a registering pointer 9. The miter gauge 5 is provided with an extension face 10 to render it suitable as a rip fence when positioned in crosswise slot 2 and locked at the desired location as by means of the locking lever 11 (shown in dotted lines) the details of which are seen more clearly in Fig. 2.

In Fig. 2 the locking mechanism is seen to consist of a stud 12 carrying an off-center or eccentric head 13, the latter being suitably recessed in the table top at a point adjacent the cross-slot 2. The position of the eccentric head 13 is such that when it is rotated it will project into the cross-slot 2. The movement of the stud and hence the eccentric head 13 is controlled by lever 11, releasably secured to stud 12 as by means of set screw 14. A thrust washer 15 bears against the top of lever 11 and the bottom of table 1 to keep the head 13 of the stud seated securely in the recess.

In operation it is only necessary to fit the bar 4 of the miter gauge in the slots 3 which run parallel with the saw and the device acts as a conventional miter gauge. In those instances where a ripping operation is called for the bar 4 of the gauge is placed in crosswise slot 2 and when the extension face 9 is at the desired distance from the cutting edge of the saw the operator need only reach under the forward edge of the table and lock the gauge in location to convert it to a rip fence.

While the stud 12 is shown more or less centrally located along the cross slot 2 it will be apparent that it may be positioned at various locations along the slot 2 and if desired several recesses may be provided along the slot, so that the position of the locking mechanism may be changed according to the use to which the miter gage is being put. For example it may be desirable in some instances to use the miter gage-rip fence as a table extension as indicated in dotted lines on the drawing. It is evident that the miter gage may serve as a table extension on either side of the table and in such instances it may be desirable to provide a recess for the locking stud along slot 2 on either side of the saw although the sliding bar 4 can be made adequately long so that a single position for the locking stud will serve for all desired positions of the miter gage. The provision of a miter gage and rip fence which also serves as a table extension is considered an important feature of the invention since in many cases the table of the conventional table saws is inadequate to allow for rip fence operations of the desired width.

I claim:

1. In a combined miter gauge and rip fence for table saws the combination of a cross slot in the table top extending at right angles to the cutting edge of the saw blade in addition to the usual cross slots extending parallel to the saw blade, a miter gauge with an angularly adjustable base and with a base bar adapted to slide in the cross slots, a stud extending through the table having an eccentric head recessed in the table top and positioned adjacent the cross slot extending at right angles to the cutting edge of the saw, and a manually operable lever attached to the stud underneath the table of the saw adapted to actuate the eccentric head.

2. In a combined miter gauge and rip fence for table saws the combination which includes the usual table having slots running parallel with the saw blade and additionally having a slot running at right angles to the usual slots ahead of the saw blade, a miter gauge having a base bar adapted to slide in the slots, a stud extending through the table having an eccentric head mounted thereon and recessed in the table, said stud and eccentric head being positioned adjacent the slot running at right angles to the saw, and a manually operable lever attached to the stud underneath the table adapted to rotate the eccentric head upon manual manipulation of the lever whereby to lock the bar of the miter gauge at a fixed location.

3. In a combined miter gage and rip fence for table saws the combination which includes the usual table having slots running parallel with the saw blade and additionally having a slot running at right angles to the usual slots and ahead of the saw blade, a miter gage having a base bar adapted to slide in the slots, a stud extending through the table and having an eccentric head mounted thereon and recessed in the table, said stud and eccentric head being positioned adjacent the slot running at right angles to the saw, and a manually operable lever attached to the stud underneath the table adapted to rotate the eccentric head against the bar in locking relation, said base bar being of such a length to allow positioning the miter gage beyond the edge of the table to serve as a table extension while the bar is locked in the slot.

References Cited in the file of this patent

UNITED STATES PATENTS

| | | |
|---|---|---|
| 271,408 | Brennan | Jan. 30, 1883 |
| 426,617 | Hales | Apr. 29, 1890 |
| 438,029 | Strahl | Oct. 7, 1890 |
| 703,749 | Stimpson | July 1, 1902 |

FOREIGN PATENTS

| | | |
|---|---|---|
| 76,958 | Switzerland | Feb. 16, 1918 |